United States Patent [19]

Burgan

[11] Patent Number: 4,522,411
[45] Date of Patent: Jun. 11, 1985

[54] FLUID SEALS WITH SELF-VENTING AUXILIARY LIPS

[75] Inventor: Thomas J. Burgan, Homewood, Ill.

[73] Assignee: Chicago Rawhide Mfg. Co., Elgin, Ill.

[21] Appl. No.: 656,267

[22] Filed: Oct. 1, 1984

[51] Int. Cl.³ .......................... F16J 15/32; F16J 15/54
[52] U.S. Cl. ...................................... 277/134; 277/153
[58] Field of Search ................................ 277/133–135, 277/152, 153

[56] References Cited

U.S. PATENT DOCUMENTS

| | | | |
|---|---|---|---|
| 3,785,660 | 1/1974 | Bush | 277/134 |
| 3,934,888 | 1/1976 | Lutz | 277/134 |
| 4,283,064 | 8/1981 | Staab et al. | 277/134 X |
| 4,336,945 | 6/1982 | Christiansen et al. | 277/153 |
| 4,350,347 | 9/1982 | Heinrich | 277/153 |

FOREIGN PATENT DOCUMENTS 907658 8/1972 Canada ............................... 277/134

Primary Examiner—Robert S. Ward
Attorney, Agent, or Firm—James T. FitzGibbon; Angelo J. Bufalino

[57] ABSTRACT

A pumping seal having an elastomeric hydrodynamic primary lip and a resinous fluorocarbon auxiliary lip. The auxiliary lip is of completely or partially frusto-conical form in at least one portion so as to provide desirable venting geometry. Said auxiliary lip is bonded to a portion of the primary seal lip adjacent the area at which the primary lip is bonded to the casing of the seal. The seal provides a strong pumping action without providing the potential for drawing a measurable vacuum in the inter-lip area.

10 Claims, 7 Drawing Figures

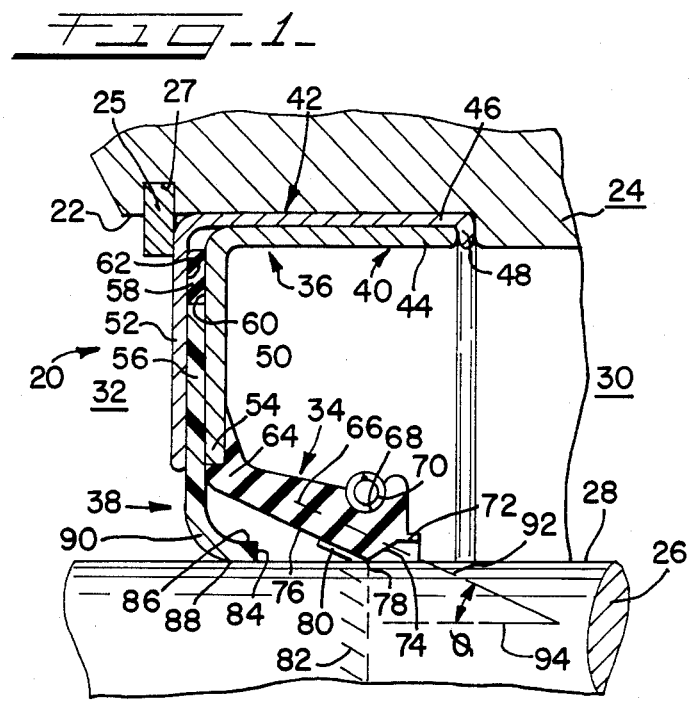
Fig-1
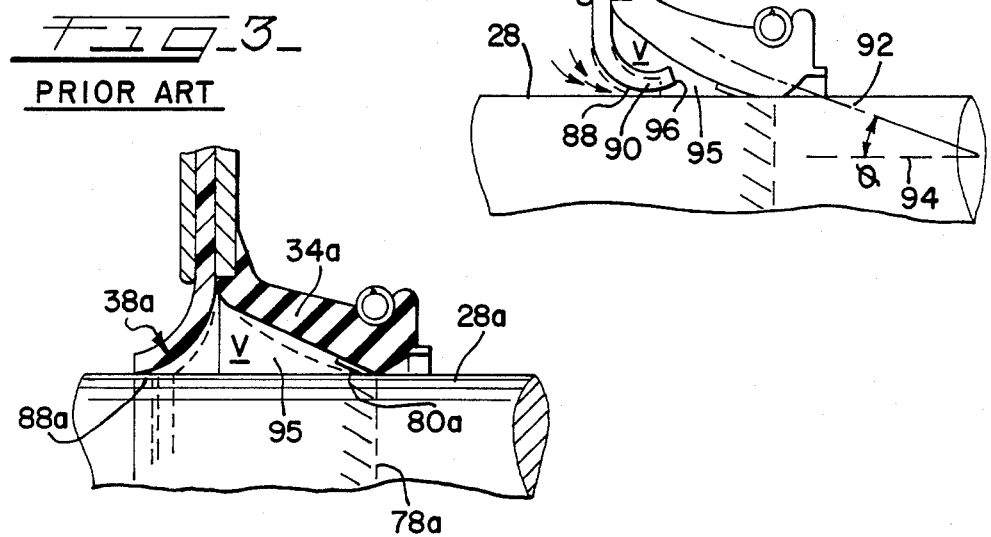
Fig-2
Fig-3
PRIOR ART

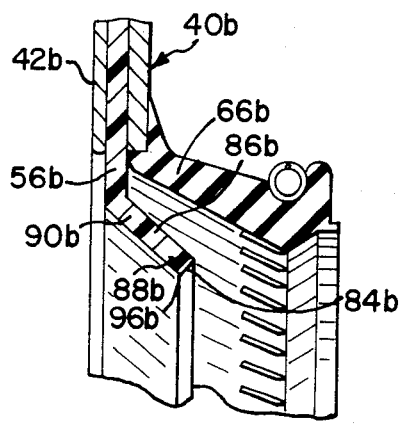
FIG-4
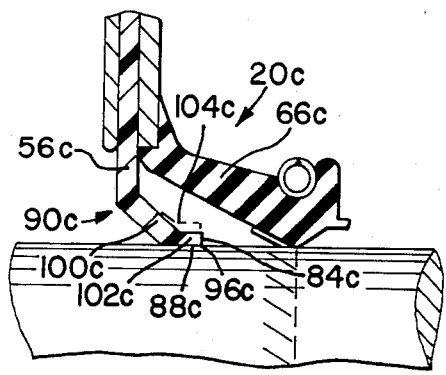
FIG-5
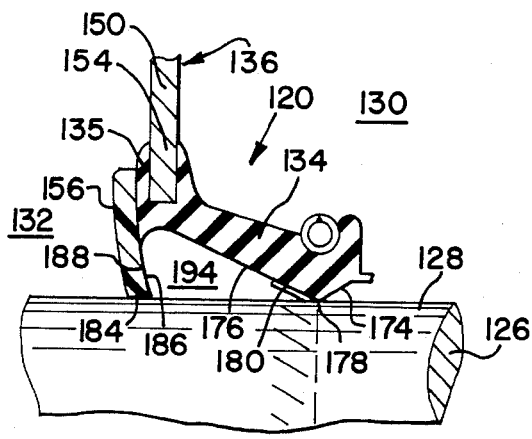
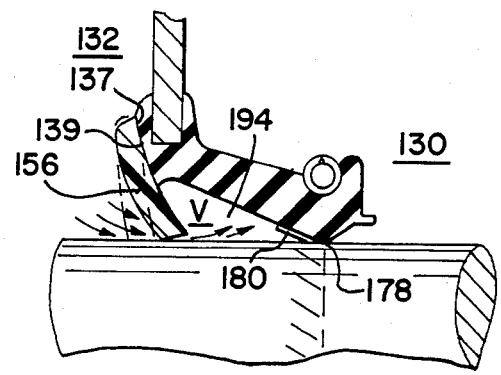
FIG-6
FIG-7

FLUID SEALS WITH SELF-VENTING AUXILIARY LIPS

BACKGROUND OF THE INVENTION

The present invention relates generally to fluid seals, and more particularly to oil and grease seals having certain constructional features which enable them to prevent generation and build up of high vacuum levels between the so-called primary lip and the auxiliary lip of the seal.

According to customary seal practice, conventional oil seals include a rigid casing portion and an elastomeric seal lip. The primary lip is comprised of a pair of frusto-conical surfaces—"oil" and "air" side surfaces meeting along a seal band to retain lubricant within the sealed region; in common practice, the angle between the shaft being sealed and the oil side surface is a steeper angle or of higher numerical degree than is the angle between the air side lip and th shaft being sealed. This arrangement has customarily provided generally satisfactory sealing in a number of applications, including a certain inherent amount of seal "pumping". However, in recent years, as sealing requirements became more severe, a number of seal designs were provided to achieve further improved or stronger pumping action.

A "pumping" seal is one wherein rotation of the sealed part relative to the seal creates a hydrodynamic action in the sealed fluid at the interface between the seal and the relatively rotatable sealed part. The purpose of this action is primarily to insure against dynamic leakage, and further, to insure that whatever small amount of fluid may escape the sealed region is pumped back by this hydrodynamic action into the sealed area. This takes the form of reducing the height or radius of the meniscus at the primary seal lip and insuring that, while there may be some initial or static leakage, on a net basis, there is substantially zero leakage because leaked fluid is returned to the sealed region by "pumping".

While not every design proposed in the patent literature for constructing a hydrodynamic seal has been effective, a number of such seals have proved effective in use.

Another feature of known oil seals over the years has been the inclusion of a so-called excluder or auxiliary lip. The construction of this lip is such that gross contaminants, such as grit and dust, are kept away from the immediate vicinity of the primary seal so as not to create abrasion or otherwise interfere with the sealing action or effective life of the seal at the primary seal band. Excluder lips have customarily been of several types; one is a lip which, although shorter and stiffer, is somewhat the reverse of a primary lip in the sense of having the surface facing away from the sealed region more steeply angled than the surface facing the inter-lip area. A typical lip of this kind, being spaced apart from the primary lip and exposed on at least one of its surfaces to ambient conditions, operates with little or no lubricant and usually runs at a higher temperature than the primary lip. While the primary lip usually employs a garter spring to secure a tight fit over the shaft, excluder lips rarely, if ever, use such springs.

Other excluder lips are of a thin, flexible cross-section, and still others are intended only to exclude the largest of contaminants and use little, if any, so-called residual or molded interference; that is, the inside diameter (ID) of the seal is usually larger or the same size as the shaft; sometimes the lip is slightly, but only slightly, smaller than the size of the shaft. In the primary lip area, there is a considerable interference or negative difference in sizes so that the seal will closely surround the shaft and needs to be stretched the shaft the same to insure effective sealing.

Whatever their design, most excluder lips solved some problems but created others; if the lips were too loose they were ineffective, and if too tight they created excess heat.

With the advent of improved seal materials, especially filled and unfilled fluorocarbon resins, it was proposed to have auxiliary or excluder lips made from or coated with a resinous fluorocarbon material. The advantage of such polytetrafluoroethylene (TFE) lips is that they run cooler and, being inherently lubricous, require less lubricant than rubber when running over a rotary shaft.

Still further, TFE has good temperature resistance, does not break down chemically and is chemically impervious to oils and their additives. TFE seals have certain drawbacks, however, including being less elastomeric and hence less able to follow the eccentricities in the shaft. While TFE does not itself resist abrasion well, it can function satisfactorily as an excluder lip if the material to be excluded is not entrapped beneath the seal lip.

Referring now to a specific problem with which the invention is concerned, the combined presence of a primary seal lip having a pumping action and a secondary seal with a relatively snug fit over an associated shaft, have served to create an actual vacuum or negative pressure in the region just outside the primary lip. Thus, in the inter-lip area between the auxiliary lip and the primary lip, where the auxiliary lip fits tightly enough over the associated sealed shaft to be air-tight or fluid-tight, the pumping action tending to withdraw oil from the inter-lip region also withdraws air therefrom. As a consequence, with the auxiliary lip not venting towards the inter-lip area, because of its geometry, and the primary lip withdrawing air and oil from this region, a vacuum occurs which is detrimental to seal performance. A high vacuum tends to draw the primary lip increasingly closely over the seal, can tend to unbalance the seal and create primary seal leakage, or can damage the auxiliary or excluder lip. In this connection, drawing the primary lip too closely over the seal causes excess wear, changes the lip geometry, and alters the pumping action.

Previous attempts to deal with this problem have provided excluder lips which were not tight enough to exclude finer contaminants, or accepting shorter seal life or reduced pumping performance of the primary seal lip. Accordingly, while there has been a demand for a seal which provides the requisite pumping action and have good excluder lip characteristics, seals which have achieved at least part of these results have been characterized by occasional, frequent, or regular creation of a damaging vacuum condition in the inter-lip area with the result of short or long term seal failure premature in respect to normally anticipated seal lives.

According to the present invention, a seal is provided which has a relatively conventional pumping type primary lip in combination with a novel TFE or other lubricous flurocarbon auxiliary lip, which is adapted to fit snugly over the associated shaft, but to deflect under vacuum conditions so as to lift slightly away from the sealed shaft and vent the inter-lip area to reduce leakage and to maintain proper lip geometry and force balance in this application.

In view of the failure of the prior art to provide a satisfactory pumping seal having a combination of good excluder action and vacuum venting in the inter-lip seal area, it is an object of the present invention to provide a seal having a hydrodynamic primary lip and a specially designed auxiliary lip adapted to achieve excellent dirt exclusion and to provide venting action in use so as to prevent premature wear and satisfactory performance in use.

Another object of the invention is to provide an oil seal having a resinous fluorocarbon auxiliary lip of a particular design.

A further object of the invention is to provide a seal having a hydrodynamic primary lip and an auxiliary fluorocarbon lip adapted to vent vacuum in the inter-lip area.

A still further object of the invention is to provide an oil seal having a casing and an elastomeric primary lip in combination with a clinched or bonded auxiliary fluorocarbon resin seal lip adapted to run in close sealing engagement with an associated shaft, but to be designed to vent or relieve vacuum under predetermined conditions.

A still further object of the invention is to provide a seal with an auxiliary lip which is curled on its inner margin so as to have its innermost edge lie closer to the primary lip than its central area or outer margin.

Yet another object of the present invention is to provide a fluid seal having a hydrodynamic primary lip and an auxiliary lip which is of completely or partially frusto-conical form in at least one portion so as to provide desirable venting geometry.

A still further object of the invention is to provide a seal with an auxiliary flurocarbon lip which is of frusto-conical shape and is bonded to a portion of the primary seal lip adjacent the area at which the primary lip is bonded to the casing of the seal.

A still further object of the invention is the provision of a fluid seal which may provide a strong pumping action without providing the potential for drawing a measurable vacuum in the inter-lip area.

An even further object of the invention is to provide a method of making seals having the foregoing advantages, characteristics and configurations.

The invention achieves its objects and advantages by providing a seal with a conventional primary lip bonded to a sealing casing and further including, either clinched or bonded thereto, an auxiliary flurocarbon resin excluder lip or ring having its inner diameter adapted for relatively snug sealing engagement with an associated rotary shaft and having the auxiliary lip inner diameter spaced more closely towards the primary lip than its intermediate area or outer margin.

The exact manner in which these and other objects of the invention are achieved in practice will become more clearly apparent when reference is made to the following detailed description of the preferred embodiments of the invention set forth by way of example, and shown in the accompanying drawings wherein like reference numbers indicate corresponding parts throughout.

BRIEF DESCRIPTION OF THE DRAWINGS

FIG. 1 is a vertical sectional view of a fluid seal embodying the principles of the invention, shown in a position of installation over a rotaty shaft to be sealed and in place within the counterbore opening of a postion of a sealed mechanism;

FIG. 2 is a fragmentary sectional view of the seal of FIG. 1, showing the position of various components of the seal under certain conditions of use;

FIG. 3 is a vertical sectional view similar to that of FIG. 2, showing a prior art seal and illustrating the drawbacks of certain prior art construction;

FIG. 4 is a fragmentary sectional view of a modified form of seal incorporating the principles of the invention;

FIG. 5 is a fragmentary sectional view showing a slightly modified form of the form of seal shown in FIG. 4;

FIG. 6 is a fragmentary sectional view of a still further modified form of seal made according to the invention; and FIG. 7 is a view of the seal of FIG. 6, showing certain aspects of the operation thereof in use.

DESCRIPTION OF THE PREFERRED EMBODIMENTS OF THE INVENTION

While seals made according to the invention may be embodied in different forms, and used in a number of applications and positions of installation, a description of several preferred forms of seal made according to the invention will be made wherein a rotary shaft is the sealed part, a housing in a machine member is used to locate the seal, and wherein the seal acts radially inwardly against the sealed rotary surface.

In keeping with the custom in the seal practice and in the patent literature, the expressions "axially inwardly" is meant to apply to a direction lying toward the sealed region; the expressions "oil" and "air" side of the various seal lips means, respectively, the sides facing toward and away from the sealed or oil-containing area of the sealed mechanism. In this connection, it will be understood that typical elastomeric lips on rotary shaft seals include a primary seal band formed along a generally circular locus at which frusto-conical air and oil side surfaces which taper in the direction of the sealed part, meet. This area is sometimes also referred to as the "seal lip" but the expression "lip" is normally intended to encompass the entire elastomeric body and the expression "seal band" means the portion of the body along which the primary seal is formed.

Further, the expression "primary" as applied to oil seals is normally intended to mean the seal formed between relatively rotatable or otherwise movable parts, such as between the seal band area of the seal lip body or the sealed part and one or more auxiliary lips, whereas "secondary" refers to a static seal formed between the casing or other seal part and the portion of a machine member with which it is associated in use. "Auxiliary" is the term applied to a seal lip not intended to seal fluid from air, but to provide another seal function such as the exclusion of dirt from the primary seal area; these seal lips or other formations are sometimes also referred to as "dirt lips" "dust lips" or the like.

Referring now to FIG. 1, a seal generally designated 20 is shown to be made according to the invention and to be in place in a counterbore 22 within a housing 24 for a mechanism which includes a rotary shaft 26 having an outer diameter 28. A retainer ring 25 received in a groove 27 holds the seal in place. The region generally designated 30 and shown to the right in FIG. 1 is the sealed region wherein oil, grease or like lubricating fluid, either in liquid or vapor form, or both is confined by the seal action, and the area 32 to the left thereof is referred to a "air" side of the seal and is separated from the sealed region 30 by the seal of the invention 20.

The seal itself, in the form shown, includes three principal elements, an elastomeric primary seal lip generally designated 34, a composite casing 36 and an auxiliary lip 38. The composite casing 36 is subdivided into an inner casing 40 and an outer casing 42, with the inner and outer casings each including axial flanges 44, 46 respectively, one of which may advantageously include a crimp or annular curl 48 locking the two together.

In FIG. 1, while the casing 36 is shown to be held in the counterbore 22 by the snap rign 25 in the alternative, the seal may be press fit into the counterbore 22, whether or not the casing includes a rubber bead or outer diameter elastomeric sleeve to provide secondary sealing.

Each of the casings 40, 42 also includes a respective radial flange 50, 52, with the inner case radial flange including an inner margin 54 serving as the bonding area to which the elastomeric seal lip 34 is bonded in use. Portions of the outer casing radial flange 52 overlie the main portion 56 of the auxiliary lip 38, and elastomeric secondary seal means in the form of a silicone or other rubber gasket 58 is provided between opposed surfaces 60, 62 of the respective flanges 50, 52 on the inner and outer cases 40, 42, for reasons which will appear.

In the form of seal shown in FIG. 1, the elastomeric lip body 34 includes a bonding portion 64, a principal lip body 66 which includes a groove 68 for receiving an annular garter spring in the manner customary in the seal art. The other portions of the seal lip body 66 include a so-called "pick trim" residue 72, which is an incidental part of the seal only and a frusto-conical, relatively steeply inclined oil side surface 74 meeting a less steeply inclined air side surface 76 to form a generally circular seal band 78, which encircles the outer surface 28 of the rotary shaft 26 to form a dynamic seal therewith.

A plurality of hydrodynamic vanes or ribs 80 are formed on the air side surface 76 of the primary seal lip so as to provide a wear pattern or "footprint" 82 so as to form a hydrodynamic vane or like formation on the sealed shaft, as somewhat schematically illustrated in FIG. 1. The exact operation of these vanes or ribs will be referred to in detail elsewhere herein. While the seal band 78 is shown as being substantially circular, and the air side surface 76 is shown to include angularly disposed ribs or vanes 80, it is understood that the seal may be any other suitable form of hydrodynamic seal. Referring now to another principal element of the invention, the auxiliary lip 38 is preferably made from a washer or disc of a fluorocarbon resin, such as a polymer of tetrafluoroethylene ("TFE") which washer is crimped in place between opposed surfaces 60, 62 of the inner and outer casings 40, 42. The gasket 58 provides a secondary seal, which is sometimes necessary in view of the plastomeric nature of the auxiliary lip material. The washer contains an innermost edge surface 84, and the auxiliary lip 38 is further defined by an oil side inner margin 86 and an air side inner margin 88. The lip 38 has a generally bell-mouthed configuration along its inner portion 90 as shown in FIG. 1; this surface may be shaped prior to manufacture, or may be a shape which is taken on by the lip merely by reason of installation in the intended application.

An important feature of the invention is that the inner edge surface 84 of the auxiliary fluorocarbon lip body 38 is directed generally axially inwardly, and that the inner margin or body portion 90 is also generally directed toward the sealed region as it approaches the rotatable sealed member. In this case, the portion 90 acts radially inwardly as it approaches and lies along the rotaty shaft 26.

Referring now to the operation of the seal, it will be assumed that a seal as shown in FIG. 1 is installed in an application of the type there shown; in such installation, the primary seal body 66 may generally be thought of as having an axis 92 of frusto-conical form in the relaxed position of the seal making a predetermined angle with the center line axis of the rotary shaft 26. The angle is parallel to the surface 76 on the air side of the elastomeric seal body and is sometimes referred to as the "barrel angle" of the seal. In the relaxed condition, this angle may be about 30°, for example. It will now be assumed that the sealed region 30 is exposed to and prelubricated with an oil in liquid and/or vapor form, and it is desired to operate the shaft of the sealed mechanism.

When the seal is in operation, as the shaft 26 rotates, the hydrodynamic action of the vanes 80 creates a pumping action which is effective to return the meniscus of oil formed between the shaft surface 28 an the sealed lip body surface 76 into the interior of the sealed region 30. This action is well known and is a feature which is intentionally designed into seals to reduce or prevent leakage. As rotation continues, particularly after a finite duration of moderate to high speed operation, the ingestion of oil into the sealed region 30 beneath the lip in the area of the seal band 78 actually creates a partial vacuum in the area of V shown in FIG. 2. In addition, the angle between the shaft centerline axis 94 and the barrel angle 92 of the seal is diminshed, as shown in FIG. 2. A consequence of this is to create a lifting and pressure relieving action on the inner portion 90 of the auxiliary lip, raising the marginal lip surface 88 off the shaft surface 28 a distance sufficient to permit venting of the vacuum and the inrush of a small quantity of air into the interlip area designated 95 in FIG. 2. While FIG. 2 shows this action in a somewhat schematic and simplified form, it will be understood that the passage of air in the direction of the arrows in FIG. 2 to the vacuum sealed area V occurs by reason of slight lifting and deflection of the seal band or surface formed between the margin 88 and the shaft surface 28.

For purposes of illustration and description herein, it is understood that the auxiliary seal is between a surface designated 88 on the fluorocarbon resin ring or washer 38 and the surface 28; this seal surface could actually be formed along a seal edge properly so-called and designated 96 in FIG. 2, however, the exact location of the surface along which the seal band is formed is not an essential part of the invention.

Referring again to FIG. 2, while the lifting or pressure venting movement required to achieve the objects of the invention is very slight, perhaps of the order of 0.001" or less, it has been demonstrated that seal lips of the forms referred to herein are effective to achieve such venting, while counterpart prior art seals of the type shown in FIG. 3, for example, lack this feature.

Referring again to FIG. 2, and also to FIG. 3, it will be noted that, as shown by the phantom lines in FIG. 3, creation of vacuum in the inter-lip area 94 of FIG. 3 causes deflection, at least to a measureable extent, of the auxiliary prior art lip or washer 38 and that of the seal body 34a as a result of vacuum created in the area 94 in the annular volume 94.

The undesirable result of such effect is measurably accelerated wear of the seal lip 34a, because it is urged on to the sealing lip with greater force than is required, and because its geometry is altered and the ribs or vanes 80a are forced to lie more closely along the shaft surface 28a. The deflection of the auxiliary lip 38a also increases the force with which its sealing margin 88a is forced to lie along the shaft, and this may also be undesirable.

Thus, it will be appreciated that prior designs permitting vacuum build-up in the inter-lip area are undesirable from the standpoint of seal geometry of the primary end auxiliary lips. In an extreme case, the vacuum might distort the primary lip 34a to the point at which the sealed band 78a is not an effective sealing area because the lip "rocks back" on the raised surfaces of the hydrodynamic formations 80a, permitting passage of oil from the sealed region back into the inter-lip area. Thus, an area sought to be kept free of oil could actually suffer from having excess oil therein because dynamic variations in the seal geometry would actually cause leakage back into an area after such area has been initially rendered free of liquid oil by pumping.

The principles of the invention are also shown to be illustrated in the form of seal illustrated in FIG. 4; in this form, the seal is the same as its counterpart in FIGS. 1 and 2, including a generally similar lip body 66b, inner and outer cases 40b, 42b and a resinous fluorocarbon washer 56 having an inner flexible sealing portion 90b. In the embodiment of FIG. 4, the only difference is that a definite frusto-conical shape is imparted to the inner flexible lip portion 90b, providing a fixed angle of inclination to the marginal surfaces 86b, 88b, to the inner edge surface 84b and the sharp edge 96b separating these surfaces. In use, this seal functions in the same manner as its counterpart in FIGS. 1 and 2.

Referring now to FIG. 5, a similar seal generally designated 20c is shown as being similar to its counterpart in FIGS. 1, 2 and 4, including having a similar primary elastomeric lip body 66c, and a sealing washer or the like 56c made from the fluorocarbon resin of its counterparts. In the embodiment of FIG. 5, the margin therein generally designated 90c is subdivided into an intermediate frusto-conical surface 100c and a generally cylindrical innermost lip surface portion 102c, with the seal band portion lying along the generally cylindrical surface 88c and the edge 96c separating this surface from the axially inwardly directed annular end face surface 84c.

In use, this seal functions the same as its above counterparts, and the phantom lines shown at 104c schematically illustrate the manner in which the contoured portion 90c may lift very slightly off the shaft surface to provide the venting action just referred to.

Referring now to FIGS. 6 and 7, a still further embodiment of the invention is shown. In this embodiment, a seal generally designated 120 is shown to include a seal lip body 134 having the air and oil side surfaces 176, 174, the seal band 178 and the hydrodynamic formations 180 of its counterparts in FIGS. 1, 2, and 4 and 5. In the embodiment of FIG. 6 and 7, however, the auxiliary lip is again in the form of a washer 156 having an axially outwardly directed, radially inner marginal surface 188, an oil side and inner marginal surface 186 directed toward the sealed region 130 and a shaft engaging edge or like surface 184; however, the primary lip body 134 also importantly includes a bonding web 135 attached to the inner margin 154 of the radial casing flange 150.

In this embodiment, rather than having inner and outer metal casings, only a single casing generally designated 136 is provided, and the fluorocarbon resin lip element 150 is shown in FIG. 7 to be bonded at an inner surface 137 thereof to a facing surface 139 of the contoured web 154. By reason of this bonding, the fluorocarbon resin auxiliary lip may be positioned as shown in FIG. 6 such that a beveled inner surface 184 thereof lies along the surface 128 of a sealed shaft 126. FIG. 7 shows the operation of the seal, that is, when a vacuum V develops in the inter-lip region generally designated 194, the contoured resinous auxiliary lip 156 deflects sufficiently so as to permit air to flow as shown by the arrows from the exterior surface 132 into the inter-lip annulus 194; the elastomeric seal body portions including the seal band 178 and the ribs 180 are effective to continue to pump oil into the sealed region 130.

A principal advantage of the seal of the type shown in FIGS. 6 and 7 is that assembly is simpler, that no crimping or secondary seals are required to position the resin washer, and in some cases, a more direct, if not simpler, manufacturing operation may be conducted. In some cases, the bonding web 154 permits a desirable "followability" of the eccentric movement of the shaft.

Referring now to other general aspects of the invention, clearly the form of auxiliary lip 156 shown in FIG. 6 or 7 could be made. The similar or identical to the form of lip shown in FIGS. 1-2 and 4-5; still other variations in the structure may be made if desired. The only requirement is that the auxiliary lip be flexible and be directed generally with its inner edges and/or margins having their innermost edges lying closer in use to the primary seal band area than their remote portions. As shown in FIGS. 1-7, the hydrodynamic pumping action is achieved through the provision of vanes, ribs or the like; it is well known that a certain degree of pumping action is also made possible by the use of a sinuous primary lip. Seals of this type have been met with great commercial success and may sometimes have a pumping action strong enough to require, in appropriate cases, the provision and arrangement of auxiliary fluorocarbon resin lips of the type described herein.

In use, the seals made according to the invention have overcome problems characteristic of certain applications wherein moderate to strong pumping is required; good dirt exclusion and low temperature auxiliary lip running is required, but wherein inter-lip vacuum is a serious problem. These include compact mechanisms becoming more common in automotive and like applications.

It will thus be seen that the present invention provides a new and improved fluid seals and seal mechanisms, having a number of advantages and characteristics, including those herein pointed out and others which are inherent in the invention.

I claim:

1. A fluid seal unit adapted to provide, in use with an associated sealed mechanism, a hydrodynamic fluid seal pumping function and a dirt exclusion function, said seal unit comprising, in combination, an annular casing unit adapted for reception within one portion of a sealed mechanism, said casing unit also including a portion to which an elastomeric seal lip may be bonded, and first and second seal lip units, said first seal lip being an elastomeric annular seal lip having a principal body portion defined in part by air and oil side frusto-conical lip surface portions meeting each other to define a generally circular primary fluid seal band adapted to contact another portion of said sealed mechanism in substantially fluid-tight sealing relation with a sealed region lying axially inwardly of said seal band, said body portion of said first lip also including hydrodynamic elements adapted to cooperate with said other part of said sealed mechanism to create a pumping action upon relative rotation between said seal lip and said sealed mechanism other part, which pumping action is effective to return oil from the air side of said seal to said sealed region, said second seal lip unit being a dirt excluder lip having a body with one margin thereof affixed to said casing and the body portions thereof spaced radially from said affixed margin being a sealed part contact portion comprising generally axially inwardly and outwardly facing surfaces and at least one sealed part contact edge lying between said inwardly and outwardly facing excluder lip surfaces, said second lip unit being constructed and arranged such that, in its relaxed condition, said sealed part contact edge lies closer to said other portion of said sealed mechanism than does said primary seal band in its installed condition, and such that said contact edge and said body portion of said second lip lying closest to said other part of said sealed mechanism lie axially closer to said primary seal band than does said margin of said exluder lip affixed to said casing, whereby said contact edge of said excluder lip may be readily lifted from said other sealed mechanism part to vent the area between said primary seal band and said contact edge in the presence of vacuum in such region, to prevent vacuum buildup in such region.

2. A fluid seal unit as defined in claim 1 wherein said hydrodynamic elements comprise vanes arranged in a helical pattern.

3. A fluid seal unit as defined in claim 1 wherein said second seal lip unit comprises a flurocarbon ring.

4. A fluid seal unit as defined in claim 1 wherein said second seal lip unit comprises a fluorocarbon resin ring unit having a planar outer margin and a frusto-conical inner margin.

5. A fluid seal unit as defined in claim 1 wherein said second seal lip unit is a fluorocarbon ring having a generally planar outer margin, and a generally cylindrical inner margin, with said inner and outer margins being joined by a frusto-conical intermediate body portion.

6. A fluid seal unit as defined in claim 1 wherein said second seal lip unit is a fluorocarbon ring of generally tapered configuration with its outer margin being bonded to an elastomeric portion of said first lip body, said first lip body portion being in turn bonded to said casing portion.

7. A fluid seal unit as defined in claim 1 wherein said second seal lip unit is a resinous fluorocarbon ring with the margin thereof lying closer to said other sealed mechanism part being of smoothly curvilinear configuration in cross-section.

8. A fluid seal unit as defined in claim 1 wherein said casing unit comprises outer and inner casing elements fastened to each other and having closely axially spaced apart radial flange margin surfaces facing each other and having said one second seal lip margin clamped in place between said margin surfaces.

9. A fluid seal unit as defined in claim 1 wherein said sealed mechanism other part is a shaft extending through an opening in said one sealed mechanism part, and whereby said primary seal band and said contact edge of said second seal body act radially inwardly.

10. A fluid seal unit as defined in claim 1 wherein said casing unit is a single element, and wherein said first seal lip is bonded to an inner margin of said casing and wherein said second seal lip is bonded to a portion of said first seal lip body which portion is spaced radially and axially outwardly of said primary seal band.

* * * * *